Oct. 15, 1963

T. A. FOX 3,106,767

ADJUSTABLE CONTOUR ROLLS

Filed June 8, 1962

INVENTOR
Thomas A. Fox

*his attorneys*

United States Patent Office 3,106,767
Patented Oct. 15, 1963

3,106,767
ADJUSTABLE CONTOUR ROLLS
Thomas A. Fox, Youngstown, Ohio
(P.O. Box 312, Poland, Ohio)
Filed June 8, 1962, Ser. No. 201,102
7 Claims. (Cl. 29—119)

This invention relates to adjustable contour rolls and particularly to rolls whose working surface may be automatically contoured for any given condition. Roller conveyor lines for handling bars or plate, strip conveyor lines, belt wrappers and strip guide rolls are usually pre-ground to a given contour, however, it is ofttimes desirable that such rolls be varied in contour to handle a particular product or condition.

Variable contour rolls have been proposed heretofore but such rolls have either been so complex in structure as to be impractical or have lacked the necessary strength to carry the loads required in the aforementioned uses. For example, Hausman Patent 2,970,339 provides a calendar roll having an adjustable crown. This roll is hollow with a thin section at the middle tapering to thicker wall sections at each end. The roll is filled with fluid and the fluid compressed. Since the roll is thinner in section at its mid point it is said to expand under the increased pressure in the fluid. This requires careful expensive machining to control the thickness of the walls uniformly over the roll. Woodward Patent 2,846,751 provides an expansible roll for straightening bows in cloth being wound on a reel. The roll is made up of many slats of flexible stock whose outer surfaces are rounded. These slats are bolted at each end to an end flange and provided in the middle with a yoke extending axially inwardly and engaging an inclined slot in an axially movable radial blade having a control rod extending through the roll. Axial movement of the control rod moves the radial blade and forces the slat inwardly or outwardly to alter the contour. Mursch Patent 2,854,235 provides a roll consisting of a shaft, a pair of spaced apart webs and a rim of rubber. Pressure of the strip on the rubber causes it to deform and expand in areas where not in contact with the strip, thus urging the strip in one direction or the other.

I have invented an adjustable contour roll which is markedly different from those described above and which has great load bearing ability, is controlled by the operator rather than the load and is simple and relatively less expensive to fabricate and operate.

I provide, in a preferred embodiment, a roll shell having a selected contoured surface formed thereon, which may be concave or convex, end rings slidable on the ends of said shell, a contoured elastomer covering the roll shell and fixed at its ends to said end rings and means acting axially on said rings to elongate the elastomer on the shell to cause the elastomer to approach the contour of the shell. Preferably the shell is provided with two axially extending hollow cylindrical portions, piston means in said cylindrical portions acting on the end rings and means selectively introducing fluid into said cylinders to move the end rings axially away from the end of the shell whereby to extend the elastomer. The elastomer may be fixed to the shell over a selected area to provide a predetermined fixed and relatively non-changing surface on the elastomer.

In the foregoing general description I have set out certain objects, purposes and advantages of my invention. Other objects, purposes and advantages will be apparent from a consideration of the following description and the accompanying drawings in which.

Figure 1:
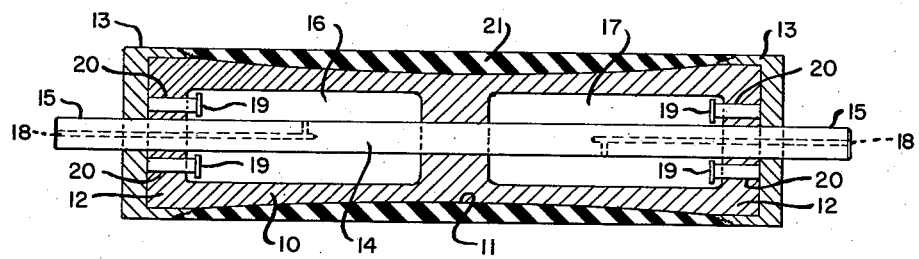
FIGURE 1 is a section through a preferred form of adjustable contour roll according to my invention.

Referring to the drawings I have illustrated a roll shell 10 having a concave outer surface 11 with generally cylindrical end portions 12. End rings 13 are slidable on the cylindrical end portions 12. The shell 10 is mounted on a shaft 14 extending axially of the shell and forming journal portions 15 on each end. The shell 10 is provided with two hollow axially extending chambers 16 and 17 receiving fluid through bores 18 in the shaft 14. Spaced pistons 19 surround the shaft 14 and extend through bores 20 in the end wall of the roll shell 10 into engagement with the rings 13. An elastomer boot 21 is fixed to the end rings 13 at each end and is freely movable over the outer concave surface 11 of the roll 10. The boot 21 may be cylindrical on its outer surface as shown, or it may be concave or convex as desired. When fluid is introduced into chambers 16 and 17, the pistons 19 are forced axially outwardly through the bores 20 and urge the end rings away from the end of the shell 10. This causes the elastomer boot 21 to stretch and become thinner over the roll. Increased movement of the rings causes an increased stretching of the boot and a corresponding decrease in its thickness. The ultimate form of the stretched elastomer will depend upon its original starting contour and the contour of the roll shell 10.

Figure 2:
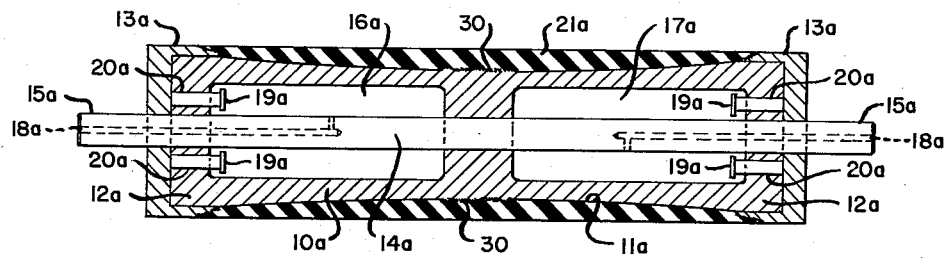
FIGURE 2 is a section through a second embodiment of adjustable contour roll according to my invention.

In FIGURE 2 I have illustrated another embodiment of my invention in which the parts are identical with those of FIGURE 1 and are given like numbers with the addition of the suffix a. The embodiment illustrated in FIGURE 2 differs from that of FIGURE 1 in having a portion 30 of the boot 21a cemented or otherwise fixed to the outer surface of the roll shell 10a. This prevents uniform elongation of the boot and leaves a raised portion on the outer surface after the boot is extended which lies over the cemented portion 30. This is particularly advantageous in providing control of tracking of the strip and the like.

Figure 3:
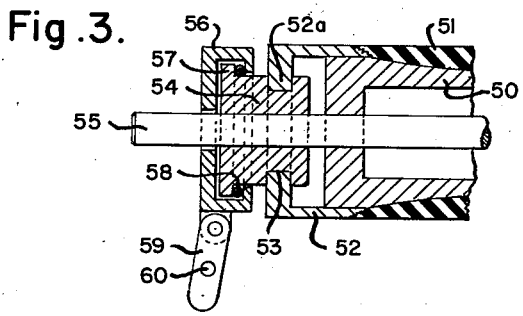
FIGURE 3 is a section through an end segment of a third embodiment of adjustable contour roll according to my invention.

In FIGURE 3 I have illustrated another form of elastomer elongating means. In FIGURE 3 I provide a roll shell 50 having an outer elastomer boot 51 with end rings 52. End rings 52 are provided with radially inwardly extending arms 52a which fit within a groove 53 in movable hub 54 axially slidable on the roll shaft 55. An actuating yoke 56 engages an annular shoulder 57 on hub 54 preferably through ball bearings 58. A yoke control arm 59 is pivoted on pin 60 adjacent the yoke 56. Movement of the arm 60 moves the end rings 52 axially of the roll to elongate or relax the elastomer boot 51.

In the foregoing specification I have set out certain preferred embodiments of my invention, however, it will be understood that this invention may be otherwise embodied within the scope of the following claims.

I claim:

1. An adjustable contour roll comprising a roll shell having a selected contoured surface thereon, end rings slidable at the ends of said shell, a contoured elastomer covering said roll shell and fixed at its ends to said end rings and means acting axially on said rings to move them away from the roll shell to elongate the elastomer whereby said elastomer approaches the contour of the roll shell.

2. An adjustable contour roll comprising a roll shell having cylindrical end portions and an intermediate selected contoured surface thereon, end rings slidable over the cylindrical ends of said shell, a contoured elastomer covering said roll shell and fixed at its ends to said end rings and means acting axially on said rings to move them away from the roll shell to elongate the elastomer whereby said elastomer approaches the contour of the roll shell.

3. An adjustable contour roll comprising a roll shell having a concave surface thereon, end rings slidable at the ends of said shell, a contoured elastomer covering said roll shell and fixed at its ends to said end rings, a hollow cylindrical portion within each end of said shell, piston means extending through the ends of said shell into said hollow cylindrical portion and acting axially on said rings to move them axially of the roll shell whereby to vary the elongation of the elastomer whereby said elastomer changes its contour following the contour of the roll shell.

4. An adjustable contour roll comprising a roll shell having a concave surface thereon, end rings slidable at the ends of said shell, a contoured elastomer covering said roll shell and fixed at its mid-portion to the concave surface of the roll shell and at its ends to said end rings and means acting axially on said rings to move them away from the roll shell to elongate the elastomer on each side of the mid-point.

5. An adjustable contour roll comprising a roll shell having cylindrical end portions and an intermediate concave surface thereon, end rings slidable on the cylindrical ends of said shell, a contoured elastomer covering said roll shell and fixed at its mid-point to the concave surface of the roll shell and at its ends to said end rings and means acting axially on said rings to move them away from the roll shell to elongate the elastomer whereby said elastomer approaches the contour of the roll shell.

6. An adjustable contour roll comprising a roll shell having a concave surface thereon, end rings slidable at the ends of said shell, a contoured elastomer covering said roll shell and fixed at its ends to said end rings, a shaft extending axially through said shell, an annular chamber in said shell at each end surrounding said shaft, piston means communicating with said chamber through bores in the end of the roll shell and engaging the end rings, and means in the shaft delivering fluid to the chambers whereby the piston means are urged outwardly from the chambers to urge the end rings away from the roll shell and thereby elongate the elastomer.

7. An adjustable contour roll comprising a roll shell having cylindrical end portions and an intermediate concave surface thereon, end rings slidable on the cylindrical ends of said shell, a contoured elastomer covering said roll shell and fixed at its ends to said end rings, a shaft extending axially through said shell, an annular chamber in said shell at each end surrounding said shaft, piston means communicating with said chamber through bores in the end of the roll shell and engaging the end rings, and means in the shaft delivering fluid to the chambers whereby the piston means are urged outwardly from the chambers to urge the end rings away from the roll shell and thereby elongate the elastomer.

References Cited in the file of this patent

FOREIGN PATENTS 1,304     Great Britain _____ Jan. 17, 1912